Sept. 22, 1959 — R. D. ANDERSON — 2,905,512
COATED PISTON RING

Filed April 24, 1958 — 2 Sheets-Sheet 1

Inventor
Roy D. Anderson
by Hill, Sherman, Meroni, Gross & Simpson
Attys.

Sept. 22, 1959 R. D. ANDERSON 2,905,512
COATED PISTON RING
Filed April 24, 1958 2 Sheets-Sheet 2
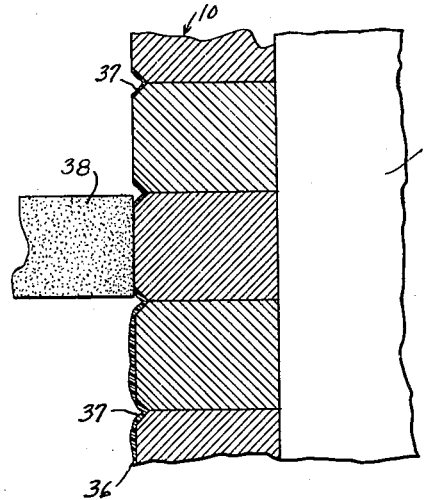
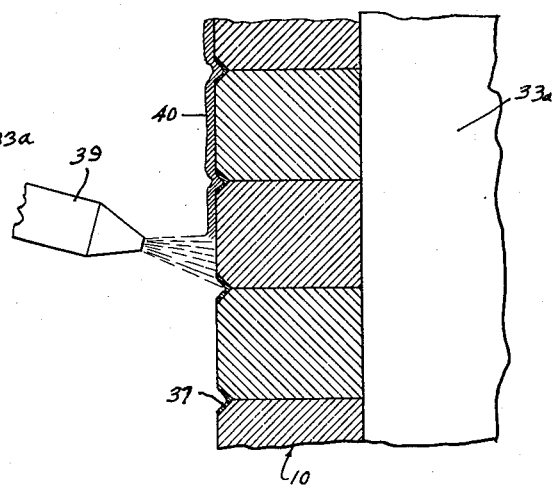
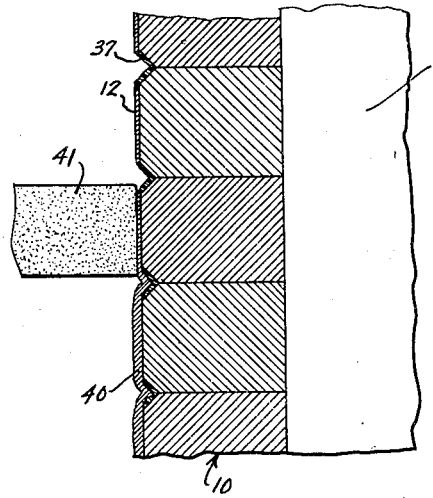
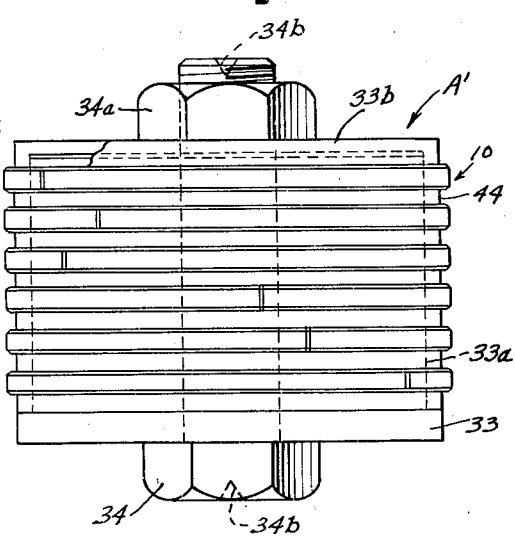
Inventor
Roy D. Anderson

United States Patent Office 2,905,512
Patented Sept. 22, 1959

2,905,512

COATED PISTON RING

Roy D. Anderson, Ballwin, Mo., assignor to Ramsey Corporation, St. Louis, Mo., a corporation of Ohio Application April 24, 1958, Serial No. 730,719

11 Claims. (Cl. 309—44)

The present invention relates broadly to the art of metal coating, and is more particularly concerned with a new and improved piston ring structure provided with a surface coating of molybdenum.

The bearing surfaces of piston rings of the compression and oil type are known to be exposed to substantial and abrasive wear by contact with the cylinder wall, as well as with the piston ring retaining ribs. Chromium has been plated on the ring bearing surfaces in order to extend ring life; however, the relatively high cost of a chromium plated piston ring has limited the use thereof to particular applications. Further, a chromium coating is relatively dense, and the oil retention properties thereof leave much to be desired.

It is therefore an important aim of the present invention to provide a piston ring carrying a molybdenum coating on its bearing surfaces and characterized by superior resistance to abrasive and erosive wear.

Another object of the invention lies in the provision of a molybdenum coated piston ring having substantially increased life under relatively high load and high speed conditions.

Another object of this invention is to provide a piston ring coated with molybdenum having superior oil retention properties and reducing engine wear, particularly during the break-in period.

A further object of the invention is to provide a method of increasing the life of piston rings which comprises applying to the bearing surfaces thereof a relatively thin coating of molybdenum.

Other objects and advantages of the invention will become more apparent during the course of the following description particularly when taken in connection with the accompanying drawings.

In the drawings wherein like numerals are employed to designate like parts throughout the same;

Figures 5, 6 and 7 are detail sectional views representing steps in the practice of the coating process of this invention; and Figure 8 is a view of a modified form of arbor arrangement suitable for coating piston rings in accordance with this invention.

Briefly stated, it has been found by applicant that a substantial increase in the life of piston rings of the oil, compression and segment type may be obtained by applying to the bearing surfaces thereof a relatively thin coating of molybdenum. Piston rings so treated are characterized by a marked increase in resistance to abrasive and/or erosive wear, and a relatively low coefficient of friction. Experience has indicated that as a result the novel piston rings have superior resistance to erosion under boundary lubrication conditions found in engine cylinders, and since the coating is quite porous, oil is carried thereby and an improvement in the engine break-in obtained. The coating may be rapidly applied to the piston rings by spraying, and the application process has a substantial cost advantage over the chromium plate procedure previously employed.

The invention additionally includes a novel process for coating piston rings of the types noted, and this comprises essentially locating a plurality of piston rings in a racked relationship, and spraying against the bearing surfaces of the rings molten molybdenum metal. A maskant may first be applied to portions of the piston rings, the maskant removed from the bearing surfaces thereof, molybdenum in sprayed form directed thereagainst, and a reduction in the molybdenum coating thickness effected.

Figure 1:
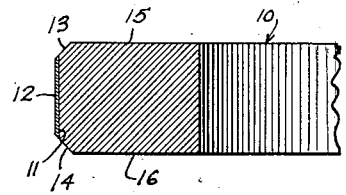
Figure 1 is a sectional view of a compression piston ring carrying a molybdenum coating on the cylinder wall contacting surface thereof.

Referring now first to Figure 1, there is shown in section a portion of a compression type piston ring 10, carrying on the face or bearing surface 11 thereof a coating 12 of molybdenum. The ring 10 is further provided with beveled surfaces 13 and 14 extending between the face 11 and side or top and bottom surfaces 15 and 16, respectively. The beveled surfaces 13 and 14 are provided to facilitate the coating operation, as will be described in detail later.

The coating of this invention may be applied to piston rings formed of various known materials, and particularly satisfactory results have been obtained with piston rings of ferrous composition, such as the various irons and steels, which may or may not have been nitrided. Molybdenum forms a strong and adherent coating upon most aluminum and magnesium alloys and other metals, and the invention is not intended to be limited to iron and steel piston rings. In addition, a chromium plate may be applied to one of the bearing surfaces, and a molybdenum coating to the other.

Figure 2:
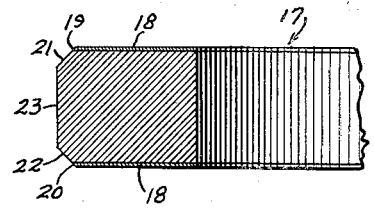
Figure 2 is a view similar to Figure 1, and in which the side or top and bottom surfaces of the ring are coated in accordance with this invention.

Figure 1 shows a molybdenum coating 12 on the bearing surface 11 which is normally in contact with the engine cylinder walls. However, a molybdenum coating may also be applied to the top and bottom or side surfaces 15 and 16 of the piston ring 10, or the coating could be formed only on said side surfaces. This is shown in Figure 2, presenting a piston ring 17 of the compression type provided with a molybdenum coating 18 on top and bottom surfaces 19 and 20. Beveled surfaces 21 and 22 are ground or otherwise formed thereon to facilitate the coating process, and the face 23 of the piston ring 17 may or may not have bonded thereto a predetermined thickness of molybdenum metal. Or, a chromium plate may be carried thereon.

Figure 3:
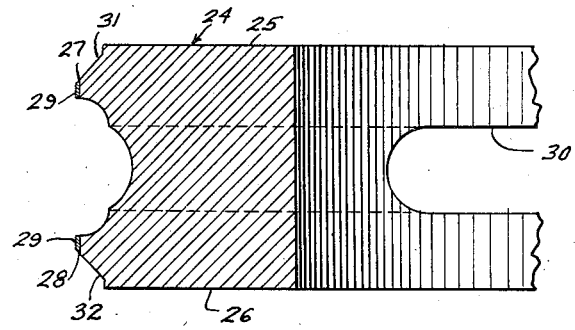
Figure 3 is a sectional view of an oil piston ring the cylinder contacting face of which carries a molybdenum coating.

Piston rings of the oil type have also been found to have substantially increased resistance to erosive and/or abrasive wear when coated as herein disclosed, and an illustration of an oil ring is presented in Figure 3. Shown therein is a piston ring designated generally as 24, having top and bottom surfaces 25 and 26, respectively, and faces or bearing surfaces 27 and 28 provided thereon with a molybdenum coating 29. A ring of this type is formed with a conventional oil groove 30, and between the faces 27 and 28 and side surfaces 25 and 26 the piston ring 24 is masked off at 31 and 32 to prevent molybdenum from contacting the surfaces 25 and 26 during the coating operation now to be described.

While various methods may of course be practiced in the application of molten molybdenum to the faces of piston rings of the compression or oil type, as well as to other articles such as iron or steel or other metal segments, applicant has found that particularly good results are obtained by following the steps illustrated in Figures 4 through 7. A plurality of piston rings 10 of the character shown in Figure 1 may be located in racked relation upon an arbor generally indicated by the legend A in Figure 4. The arbor comprises at one end a collar portion 33 integral with a reduced diameter mandrel portion 33a surrounded at the opposite end of the arbor with a cap portion 33b bearing against the piston rings 10. Bolt means or the like 34 provides a bottoming surface for the collar portion 33, and said bolt means has threaded thereon at its opposite end a nut or similar means 34a which upon tightening maintains the rings 10 in firm position between the collar 33 and cap portion 33b. The bolt means 34 may be grooved at opposite ends, as indicated at 34b, to facilitate mounting of the arbor A upon suitable drive means.

Figure 4:
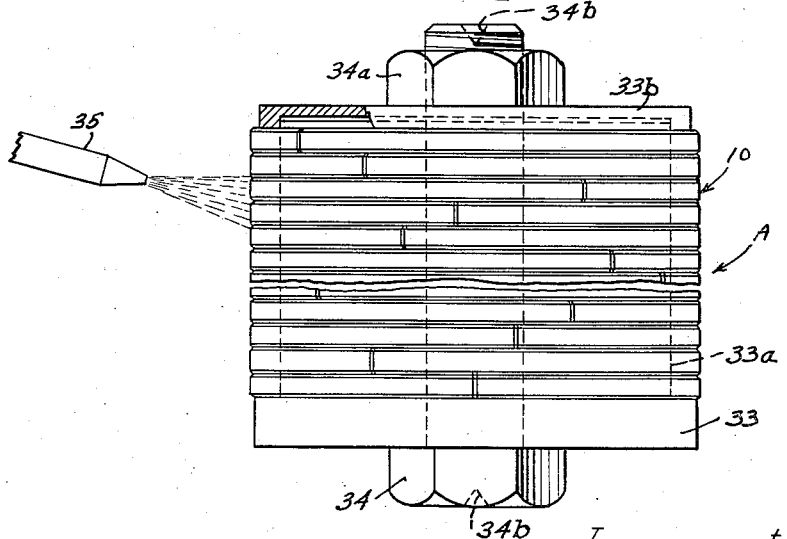
Figure 4 is a view of an arbor arrangement upon which piston rings may be coated following the principles of this invention.

Prior to applying a masking material to the rings 10 as shown in Figure 4, the rings are ground or machined to include the beveled surfaces 13 and 14, as well as being finish ground along the face or bearing surfaces 12 to remove oxides or other deposits thereon. Grinding or otherwise abrading the beveled surfaces and bearing surfaces may be accomplished either before or after loading of the piston rings 10 upon the arbor A. As shown, the rings 10 when mounted on said arbor may have their ends staggered.

In order to avoid the possible formation of oxide deposits upon the ground piston rings 10, there is immediately applied thereto a masking material for the purpose of preventing the deposition of after-applied molybdenum spray upon the sides or top and bottom surfaces 15 and 16 of the rings 10, which would be likely to cause adherence of the rings one to the other when sprayed with molybdenum. The maskant may be applied to the outer surfaces of the rings 10 by brushing it thereon; however, substantial time savings are effected by use of a spray gun 35 in the manner of Figure 4. The arbor A may be caused to revolve by use of suitable drive means, and during this movement the spray gun 35 is directed across to assure a complete coating of the rings 10 with maskant.

Upon completion of the maskant spraying step of Figure 4, the piston rings 10 carry upon their faces 11 and beveled surfaces 13 and 14 a layer of maskant 36 shown in the lower portion of Figure 5. It is to be noted in this connection that the maskant 36 forms a generally V-shaped groove 37 upon the beveled surfaces 13 and 14, and by provision of the maskant formation shown, there is substantially no likelihood of the later-applied molybdenum coating entering between the upper surface of one piston ring 10 and the lower surface of an adjacent ring 10 to bond the rings one to the other upon the arbor A.

Subsequent to the application of masking material, which may be any compound adapted to be sprayed and possessed of good adherence to the metal of the rings 10, the maskant 36 is removed from the face or bearing surface 11 of each piston ring 10. Various procedures may be employed to effect this result, and a suitable means is a grinding wheel 38. Maskant removal from the bearing surfaces 11 is readily accomplished upon the rings 10 while mounted upon the arbor A, and the grinding wheel 38 is manipulated across in contact with the bearing surface 12 while the arbor A is rotated with the rings thereon. The piston rings 10 after being ground in the manner described are shown in the upper portion of Figure 5, and it may be seen that maskant remains in the V-grooves 37 formed by the beveled surfaces 13 and 14.

The next step in applicant's process is the application of molten molybdenum metal to the surfaces of the piston rings 10 exposed upon the arbor A. A spray gun 39 is also preferred for this purpose, and while many units are satisfactory, commercially available spraying equipment offered for sale by the Metallizing Engineering Company, Inc. of Long Island, New York, has provided satisfactory results in practice. By this and related apparatus, the coating may be controlled to within 0.001 inch.

Molybdenum is preferably supplied to the spray gun 39 in the form of wire, and a material having good characteristics is that identified as "Sprabond Wire" by it's manufacturer Metallizing Engineering Company, Inc. "Sprabond Wire" is essentially pure molybdenum, and when heated to around 1400 degrees F., the metal gives off a readily visible "smoke" which is the condensate of the common oxide of molybdenum ($MoO_3$). Although the metal melting point of molybdenum is 4750 degrees F., its principal oxide is given off as a vapor at 1400 degrees F. and apparently most of the oxide is in a vapor phase when the metal strikes the surface. This permits clean and uncombined metal to establish an intimate contact wtih the surface being sprayed. It would appear that as a result there is formed between the surface or base and the molybdenum metal an alloy of superior bonding characteristics.

It has been found desirable that the molybdenum be applied in the manner of Figure 6 to a thickness of approximately 0.008 inch, and that thereafter the coating 40 of Figure 6 be reduced to a desired thickness of approximately 0.004 inch or less. A grinding operation is suitable to reduce the coating thickness, although other methods may of course be employed. The grinding step to accomplish coating thickness reduction may be performed while the rings 10 are located on the arbor A, and a grinding wheel 41 is preferably employed as shown in Figure 7. The arbor A is again rotated, and the grinding wheel 41 moved across in contact with the molybdenum coating 40 to effect essentially the thickness reduction shown in Figure 7. The metal coating remaining after the grinding step is designated in Figure 7 by the legend 12.

Subsequent to the disclosed steps of Figures 4, 5, 6 and 7, maskant in the grooves 37 is removed in a suitable manner. This may be accomplished by a grinding step while the rings 10 remain on the arbor A, or the rings 10 may be removed therefrom and the maskant dissolved in a suitable solvent. As thus processed, the piston rings 10 are in the form shown in Figure 1 and may be installed on the piston head (not shown) to provide a marked increase in resistance to abrasive and/or erosion wear, as well as the other noted advantages obtained from the present invention.

As an alternative to the piston ring mounting arrangement above described, the rings may be located in the manner shown in Figure 8. An arbor A of the same construction as previously described in connection with Figure 4 is preferably employed. Piston rings 10 located upon the arbor A may or may not be provided with beveled surfaces 13 and 14 as desired, and positioned between each ring is a spacer member 44 of relatively lesser outer diameter than the rings 10. The spacer members 44 are constructed in a ring configuration and closely encircle the arbor A in abutment with the lower surface of one ring and the upper surface of adjacent ring.

The spacer members 44 function to maintain the rings 10 at a sufficient distance with respect to one another so that molybdenum sprayed thereagainst does not form upon the upper and lower surfaces of the rings to cause sticking or bonding therebetween. After the piston rings 10 have been ground along their bearing surfaces 11 in the manner noted in connection with Figure 4, maskant is applied thereto, followed by the maskant removal, metal spray, and metal coating thickness reduction steps earlier described. Beveled surfaces 13 and 14 upon the rings 10 in the arrangement of Figure 8 aid to a degree in preventing metal spray from reaching the upper and lower surfaces 15 and 16; however, it is within the contemplation of this invention that a molybdenum coating be applied to the bearing surfaces of the rings 10 immediately following the grinding of said surfaces to remove any oxides thereon. In this instance, it is then only required after the metal spray step that the coated surfaces be reduced to the thickness desired.

It will be apparent from the foregoing that an alternative method is normally required when a metal coating is desired upon the upper and lower or side surfaces of the piston ring as shown in Figure 2. Piston rings 17 as shown therein may be metal coated by arranging the rings upon an arbor provided with spaced and raised ribs thereon of a diameter corresponding essentially to the inner diameter of the piston rings 17. Unless it were desired that the face 23 and beveled surfaces 19 and 20 not have a molybdenum coating thereon, it would normally not be necessary that the noted surfaces be coated initially with maskant. In certain applications it may be found well to provide a molybdenum coating on both the face and upper and lower surfaces of the ring, and in this instance the face may be coated by use of the arbor arrangements shown in the drawings, and the rings thereafter transferred to a mandrel or arbor of different construction or to other mounting means supporting the piston rings during coating of the upper and lower surfaces thereof. Also, it may be found desirable to chromium plate one of the bearing surfaces, and apply molybdenum to the other.

Piston rings of the oil control type, formed as shown in Figure 3, may also be coated upon the arbor arrangements disclosed herein or in any other manner as will now be apparent to those versed in the art. The upper and lower or side surfaces 25 and 26 of the piston ring 24 of Figure 3 may also carry a molybdenum layer thereon, and other ring members whose bearing surfaces are subjected to substantial abrasive and/or erosive wear may have sprayed thereagainst or otherwise formed thereon a relatively thin coating of molybdenum. Molybdenum is possessed of relatively low coefficient of friction, and provides substantial resistance to erosion under boundry lubrication conditions found in engine cylinders. The coating is relatively porous, and oil is efficiently carried thereon enhancing the value of the disclosed structure during engine break-in periods. Piston rings of various materials are advantageously coated in accordance with this invention, and plain or nitrided steel rings, iron rings and various alloy rings are within the purview of this invention.

It may be seen from the foregoing that applicant has provided a novel piston ring and method of coating the same which has substantial advantages over the piston rings of the chrome plated type. Molybdenum may be applied to any of the bearing surfaces of piston rings at a substantially lower cost than chromium; however, in particular applications it may be required that certain surfaces of the piston ring carry a chromium coating while other surfaces embody the molybdenum coating of this invention. However, even in a structure of this character, there is obtained superior abrasive and erosion resistant properties at a cost relatively lower than a completely chromium plated piston ring. Further, molybdenum metal may be readily lapped during application to assure a relatively light tight piston ring construction. A substantial increase in ring life is obtained as compared to a non-coated ring, and as contrasted with a chromium plated ring, there is obtained in addition to the cost advantage, an improvement of marked degree in wear characteristics due to the particle hardness of the molybdenum which has a low elastic modulus. And additional advantages over the chromium plated ring structure are the microsopic porosity of the molybdenum metal which provides good oil retention for lubrication purposes, and the low friction properties of molybdenum providing a substantial increase in resistance to erosion.

It is to be understood that modifications may be effected in the structures and processes herein disclosed without departing from the spirit of the invention or the scope of the subjoined claims.

I claim as my invention:

1. A piston ring having substantially increased resistance to abrasive wear, and provided upon at least one surface thereof with a relatively thin coating of molybdenum metal intimately bonded to said surface by an alloy of the molybdenum metal and the ring metal.

2. A piston ring of the compression, oil or segment type provided with bearing surfaces, at least one of the bearing surfaces carrying thereon a highly wear resistant and relatively thin coating of molybdenum bonded to said surface by an alloy of the molybdenum metal and the ring metal.

3. A piston ring provided with top and bottom and face surfaces adapted to be in abrasive contact with the piston and cylinder wall respectively, at least one of said surfaces carrying thereon a relatively porous spray coated layer of molybdenum intimately bonded thereto by an alloy of the molybdenum metal and the ring metal.

4. A piston ring provided with an essentially flat bearing face normally in frictional sliding contact with the engine cylinder wall, said ring including beveled surfaces on the outer diameter corners thereof and a fusion coating of molybdenum metal on the bearing face bonded to said face by an alloy of the molybdenum metal and the ring metal.

5. A piston ring provided with top and bottom surfaces normally in abrasive contact with the ring retaining ribs of an engine piston, said ring including beveled surfaces on the outer diameter corners thereof and a fusion coating of molybdenum metal on the top and bottom surfaces bonded to the latter surfaces by an alloy of the molybdenum metal and the ring metal.

6. A piston ring having substantially increased resistance to abrasive and erosive wear and having a bearing surface normally in abrasive contact with the engine piston and a further bearing surface in abrasive contact with the engine cylinder wall, said ring having a chromium coating plated on one of the bearing surfaces and a molybdenum coating fusion bonded to another of the bearing surfaces.

7. A method of coating piston rings to substantially increase the abrasive and erosive wear characteristics thereof, which comprises locating a plurality of cleaned piston rings in racked relation to one another, spraying said rings with molybdenum metal to form thereon a fusion metal coating, and reducing the thickness of said coating to a predetermined value.

8. A method of coating piston rings to substantially increase the abrasive and erosive wear characteristics thereof, which comprises locating a plurality of rings having beveled outer diameter corners in racked relation, providing a coating of masking material upon said corners and forming a generally V-shaped seal thereon, and applying to the faces of the rings a molten molybdenum coating, said masking material preventing the entrance of molten molybdenum between adjacent rings.

9. A method of coating piston rings to substantially increase the abrasive and erosive wear characteristics thereof, which comprises locating a plurality of rings having beveled outer diameter corners in racked relation, applying a maskant to said corners and to the exposed faces of the rings, removing the maskant from said faces, applying molten molybdenum to the corners and faces of the rings and forming on the faces a relatively porous fusion coating, and removing the maskant and molybdenum coating from the ring corners.

10. A method of coating piston rings to substantially increase the abrasive and erosive wear characteristics thereof, which comprises locating a plurality of rings having beveled outer diameter corners in racked relation, applying a maskant to said corners and to the exposed faces of the rings, removing the maskant from said faces and spraying molten molybdenum upon the corners and faces of the rings and forming upon said faces a relatively porous fusion coating, and removing the maskant and molybdenum coating from the ring corners to provide upon the ring faces a substantially uniform thickness molybdenum coating having a relatively low coefficient of friction and oil retention properties.

11. A method of coating a bearing surface of piston rings to substantially increase the abrasive and erosive wear characteristics thereof, which comprises assembling a plurality of piston rings with the bearing surface of one piston ring spaced from the bearing surface of an adjacent ring, and directing against said bearing surfaces a spray of molybdenum metal to form thereon a porous adherent coating of molybdenum bonded to the surface by an alloy of molybdenum and the surface metal.

References Cited in the file of this patent

UNITED STATES PATENTS

| | | |
|---|---|---|
| 2,337,588 | Calkins | Dec. 28, 1943 |
| 2,387,872 | Bell | Oct. 30, 1947 |
| 2,488,697 | Ackerman | Nov. 22, 1949 |